(12) United States Patent
Chiang

(10) Patent No.: US 8,432,498 B2
(45) Date of Patent: Apr. 30, 2013

(54) AUTOMATIC FREQUENCY SELECTION FOR PEAKING

(75) Inventor: Patricia Wei Yin Chiang, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 260 days.

(21) Appl. No.: 12/908,678

(22) Filed: Oct. 20, 2010

(65) Prior Publication Data

US 2012/0098973 A1 Apr. 26, 2012

(51) Int. Cl.
*H04N 7/12* (2006.01)

(52) U.S. Cl.
USPC .......................................................... 348/735

(58) Field of Classification Search .................. 348/735, 348/678, 679, 725; 375/240.2, 240.8; 455/192.2
See application file for complete search history.

(56) References Cited

U.S. PATENT DOCUMENTS

| | | | | |
|---|---|---|---|---|
| 4,739,407 A * | 4/1988 | Mack et al. | ................... | 348/728 |
| 4,814,887 A * | 3/1989 | Marz et al. | ................... | 348/735 |
| 5,225,902 A * | 7/1993 | McMullan, Jr. | .............. | 725/121 |
| 5,487,186 A * | 1/1996 | Scarpa | ....................... | 455/192.2 |
| 6,810,082 B1 * | 10/2004 | Shen et al. | ................. | 375/240.2 |
| 7,986,929 B2 * | 7/2011 | Krone | ......................... | 455/192.2 |
| 2009/0207956 A1 * | 8/2009 | Kimura et al. | ................ | 375/346 |

* cited by examiner

*Primary Examiner* — Paulos M Natnael
(74) *Attorney, Agent, or Firm* — Hogan Lovells US LLP

(57) ABSTRACT

An automatic frequency selection circuit includes a base filter for receiving a video input, a peaking filter for receiving the video input, a first energy computation unit coupled to an output of the base filter, a second energy computation unit coupled to an output of the peaking filter, an automatic frequency control unit to compare relative measured energies of the first and second energy computation units and to output a temporarily stable selected frequency for a targeted attenuation, and a frame delay feedback unit for receiving the temporarily stable selected frequency coupled to the peaking filter.

20 Claims, 3 Drawing Sheets

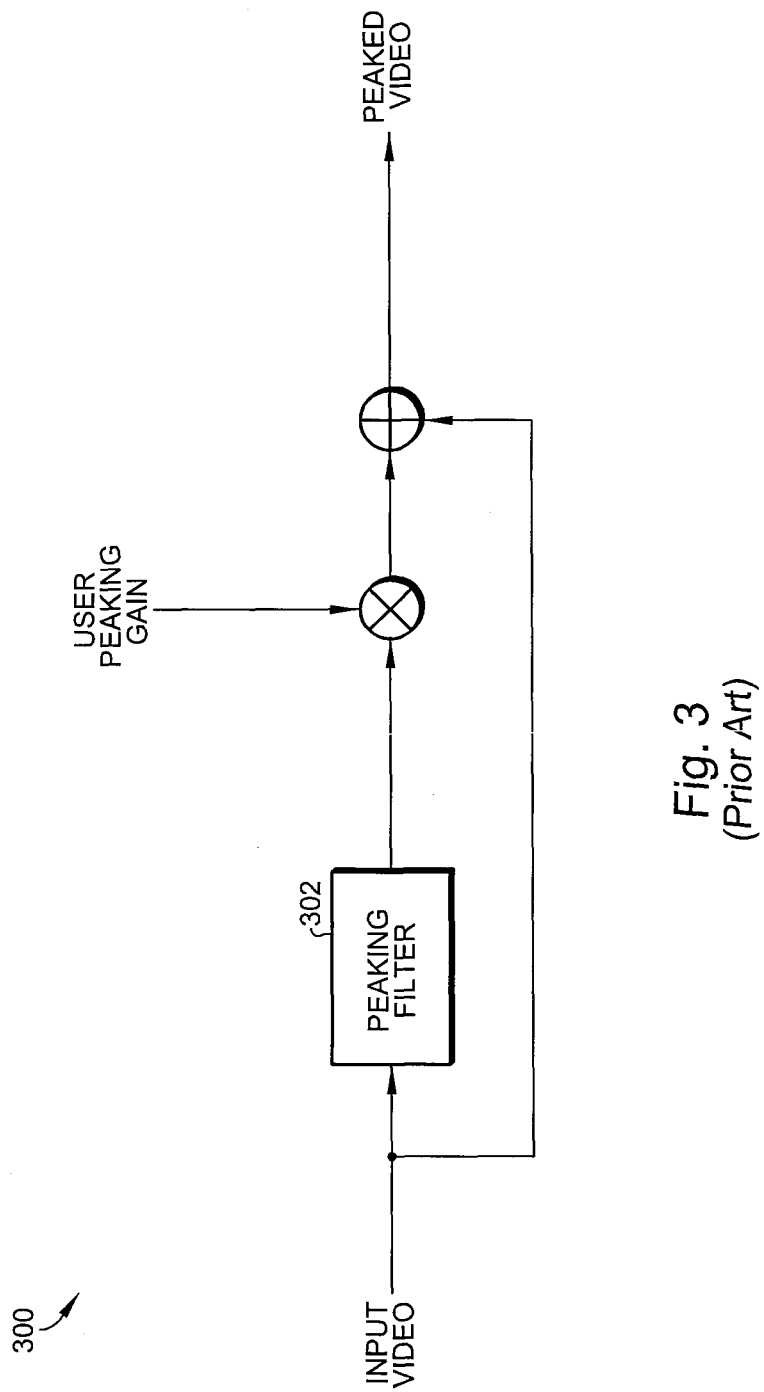

AUTOMATIC FREQUENCY SELECTION FOR PEAKING

BACKGROUND OF THE INVENTION

1. Field of the Invention

The present invention relates to image quality improvement in the field of video processing. More particularly, the present invention can be applied to image quality improvement in end consumer products like television, display sets, video CD players, DVD players or recorders and set-top-boxes.

2. Description of the Related Art

Basic peaking for improvement in video image quality typically comprises a user-defined peaking frequency and combinations of frequency and filter type that can be set differently according to user-preference or profile settings.

More advanced peaking uses a peaking filter in combination with the re-scaling, for example a peaked frequency response on a rescaling polyphase filter. In that case, the absolute frequency of the filter changes with the resizing ratio to guarantee that the same details are peaked during zoom in or zoom out applications. Similar to basic peaking, a user-defined peaking frequency is selected among pre-determined filter responses with consideration of the scaling factor.

The frequency characteristics of input video are dependent on local video content and they may be subjected to different processes of attenuation and bandwidth limitation prior to peaking. Examples of processes that affect frequencies of video include source capture or generation, camera zoom-in and out, source format and corresponding display format, transmission bitrate, transmission bandwidth and video editing, video pre-processing and post-processing.

Prior art solutions can compensate for change in bandwidth only under specific scenarios where the video resizing is performed in combination with peaking to convert the source format to an output display format. However, an application of peaking in a backend TV chip must be robust to input with any frequency content.

Effective sharpness enhancement may be achieved with peaking at critical frequencies specific to the video content. Peaking at a frequency lower than the critical range makes the picture un-natural with large halos surrounding the large object edge. Peaking at a frequency above the critical range may result in insufficient sharpness and amplification of noise.

A prior art circuit is shown in FIG. 3 including an input video, a peaking filter 302, a user peaking gain input, an adder, and a peaked video output.

What is desired, therefore, is a simple global automatic frequency selection circuit and method so that optimal sharpness enhancement may be achieved.

SUMMARY OF THE INVENTION

According to the present invention, the appropriate frequency range for peaking is selected according to video content. By analyzing the frequency spectrum, the range of frequency with critical attenuation to be compensated can be identified according to the general shape of the frequency spectrum and its roll off frequency and factor.

While frequency spectrum analysis normally requires extensive computation, simplification according to the present invention is achieved by employing a base filter of sufficiently low frequency and comparing the energy of the base filter with the peaking filter. The energy of the base filter will generally be higher than that of the peaking filter and this energy decreases as peaking frequency increases. With a target attenuation over which the video is compensated by peaking, the selected peaking frequency can converge temporarily to the optimal frequency.

The automatic frequency selection apparatus of the present invention includes a reference base filter to detect the lower frequency content, a peaking filter, two energy computation units to measure energies of filtered output, an automatic frequency control unit to compare relative measured energies and output a temporarily stable selected frequency, and a frame delay feedback of the selected frequency to the peaking filter. If desired, the automatic frequency control can include a filter gain adjustment block as well for a separate adjustment of the filter gain.

The circuit and method of the present invention provide a novel and simple global automatic frequency selection apparatus such that optimal sharpness enhancement may be achieved. The invention further adjusts the gain automatically such that over-sharp details are peaked.

BRIEF DESCRIPTION OF THE DRAWINGS

Other objects and advantages of the present invention will become apparent from the following description of the preferred embodiment with reference to the drawings, in which:

FIG. 3 is a prior art peaking circuit.

DETAILED DESCRIPTION

The operation of the invention is described below with reference to drawing FIGS. 1-2.

Generally, the circuit of the present invention is embedded in peaking filter circuitry that improves the sharpness of the input video stream. In one preferred embodiment, the peaking filter circuitry is inserted after the rescaler in a display processing pipe. In an alternate embodiment, the peaking filter circuitry is combined with the rescaler in a display processing pipe. In another alternative embodiment, the peaking filter is inserted before the rescaler in a display processing pipe. In a preferred embodiment, the peaking circuitry comprises a pre-determined set of designed filter coefficients that can be loaded at frame or field level to control the range and frequency of peaking.

An example of a peak filtering circuit 300 according to the prior art is shown in FIG. 3 including peaking filter 302 for receiving the Yin input video input and having an output for providing filtered data to a multiplier. The multiplier also receives the user peaking gain. The output of the multiplier is added with the original Yin input video to provide the Yout peaked video output signal as shown.

Figure 1:
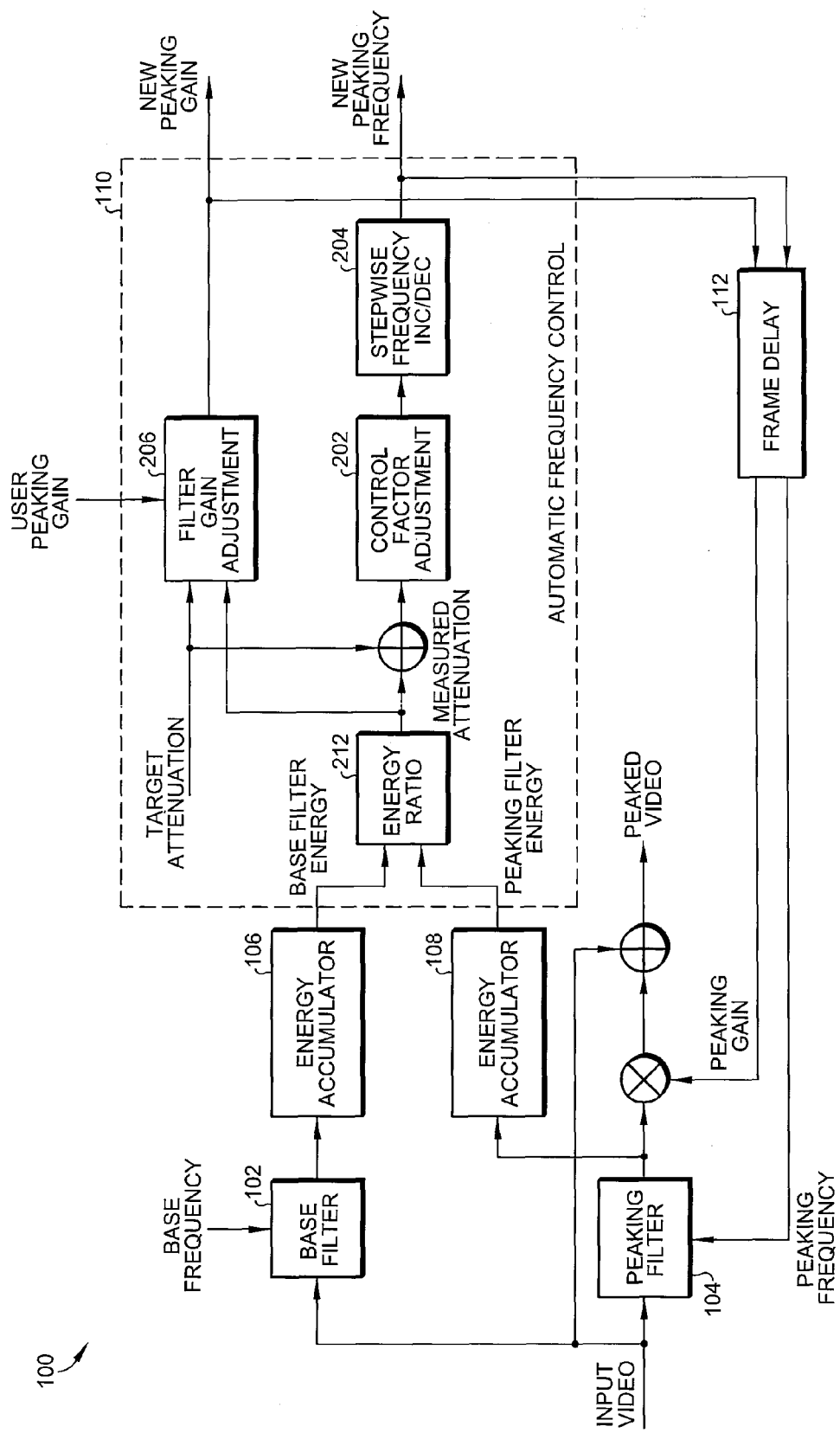
FIG. 1 is a functional block diagram for a global automatic frequency control circuit according to a first embodiment of the present invention including a peaking gain control function.

The functional block diagram for the global automatic frequency control circuit 100 is shown in FIG. 1. Depicted in FIG. 1 are a base filter 102 and a peaking filter 104, both of which have inputs that receive the Y video signal (peaking is a technique applied only to the luminance signal). Both filters 102 and 104 can be implemented as FIR (Finite Impulse Response) filters. For the purposes of the following detailed description, a base filter is defined as a filter with a frequency response in the low and midrange frequency bands. The operating ranges can be expressed as a normalized sampling frequency (ratio of sampling frequency). For example, a typical base filter range is 0.10 to 0.44, whereas a typical peaking filter range is 0.24 to 0.82. For a sampling frequency of a standard definition video of 6.75 MHz the base filter range is 0.7 to 3.0 MHz, whereas the peaking filter range is 1.6 to 5.5 MHz. For a sampling frequency of a high definition video of 74.25 MHz the base filter range is 7.4 to 32.7 MHz, whereas the peaking filter range is 17.8 to 60.9 MHz.

The base filter 102 receives a base frequency signal, and the peaking filter 104 receives a peaking frequency signal as is explained in further detail below. The output of base filter 102 is coupled to a first energy computation unit 106. The output of peaking filter 104 is coupled to a second energy computation unit 108. Both energy computation units 106 and 108 can be implemented as square law functional circuit blocks. The output of the energy computation units 106 and 108 are coupled to the input of an automatic frequency control unit 110, which is described in further detail below. The automatic frequency control unit 110 also receives a target attenuation signal, a user peaking gain, and provides a new peaking gain and a new peaking frequency. The outputs of the automatic frequency control unit 110 are delayed until the next frame by a frame delay feedback unit 112, which provides the peaking frequency signal to the peaking filter 104 as shown, and the peaking gain to the multiplier as shown. The final peaked video is provided by summing the original input video with the output of the multiplier as shown in FIG. 1.

The base frequency filter 102 and peaking filter 104 operate in parallel. The peaking energies of both filters are accumulated over pixels in a line and lines in a field and are described by $$\text{peaking\_energy} = \sum_{j=1}^{picheight} \sum_{i=1}^{picwidth} \text{clip}(f_{i,j}^2)$$

where $f_{i,j}$ is the filtered data in (l,j) position.
individual filter pixel energy is clipped to prevent extreme variance due to noise and the accumulated energy is re-scaled within each line to prevent overflow.

Temporal control is used to adjust the peaking frequency slowing such that the optimal frequency provides the smallest deviation between the target attenuation and the measured attenuation.

Referring still to FIG. 1, the automatic frequency control block 100 is explained in greater detail. The filter gain and adjustment block 206 receives the target attenuation signal, a measured attenuation signal, and a user gain signal to provide the new peaking gain. A control factor adjustment block receives an "err" error signal and provides a "terr" error signal. A stepwise frequency increment/decrement block 204 receives the "terr" error signal and provides the new peaking frequency. The new peaking gain and the new peaking frequency are received by a frame delay block 112 to provide output frequency and gain signals. These signals are in turn received by the peaking filter 104 and the multiplier as previously explained. The base filter energy provided by energy accumulator 106 and the peaking filter energy provided by energy accumulator 108 are received by the energy ratio block 212. The energy ratio block 212 then provides a measured attenuation signal. The target attenuation signal is subtracted from the measured attenuation signal to provide the "err" error signal.

The energy ratio block 212 is now described in further detail. The error between the measured and the targeted attenuation is determined and used to adjust a control factor k. Measured attenuation is described by peaking-to-base filter energy.

$$\text{measured\_attenuation}_n = \frac{Energy_{n,peaking}}{Energy_{n,base}} \times SF_1$$

$$err_n = \text{measured\_attenuation}_n - \text{target\_attenuation}$$

Subscript n refers to time n. $SF_1$ refers to scaling factor and specifies the range of measured_attenuation$_n$ and target_attenuation. An example is $SF_1$=256. $Energy_{n,peaking}$ refers to the energy output of the peaking filter at time n. $Energy_{n,base}$ refers to the energy output of the base filter at time n.

The control factor adjustment block 202 is now described in further detail.

$$k_n = \begin{cases} k_{n-1} + 1 & \begin{array}{l} freq_{n-1} \mathrel{!}= freq_{n-2} \text{ \& } \text{sign}(err_n) \mathrel{!}= \text{sign}(err_{n-1}) \text{ \&} \\ \text{abs}(err_n) \leq \text{abs}(err_{n-1}) \text{ \& } k_{n-1} = k_{n-2} \end{array} \\ k_{n-1} - 1 & \begin{array}{l} \text{abs}(freq_{ref} - freq_{n-1}) > SF_2 \times \\ \text{abs}(\text{measured\_attenuation}_{ref} - \text{measured\_attenuation}_n)/2^k \end{array} \\ k_{n-1} & \text{otherwise} \end{cases}$$

Subscript n refers to time n. $SF_2$ refers to scaling factor. An example is $SF_2$=⅝. $k_n$ is the control factor for division. $freq_{ref}$ is the last recommended peaking frequency that has the closest match of measured_attenuation$_{ref}$ to the target_attenuation.

Control factor k is increased when there is a sign change in the error signal for different consecutive peaking frequencies using the same control factor k and the current absolute error is smaller or equal to the previous error. This is done to stabilize any possible oscillations and to compare the two frequencies that give the closest attenuation.

Control factor k is decreased when the attenuation differences per change in frequency are smaller compared to precision specified by the control factor k. A higher precision is given by a lower k. This is done to increase the sensitivity of the control factor to different video content.

The stepwise frequency increment/decrement block 204 is now described in further detail below.

$$terr_n = err_n / 2^{k_n}$$

$$step_n = \begin{cases} +1 & terr_n > 0 \\ -1 & terr_n < 0 \\ 0 & terr_n = 0 \end{cases}$$

$$freq_n = freq_{n-1} + step_n$$

Having adjusted the control factor, it is applied to the error signal where a positive error, $terr_n > 0$, gives rise to a stepwise increase in peaking frequency and a negative error, $terr_n < 0$, gives rise to a stepwise decrease in peaking frequency.

It is possible that the initial control factor may bias the final peaking frequency but typically different initial control factors should only give rise to a one step difference in selected frequency.

The filter gain adjustment block 206 is now described in further detail below.

After frequency selection, filter gain control is added to improve the performance of peaking on sequences with high bandwidth especially the interlace sequences as the vertical peaking filter has a limited functional range. Too high a filter gain with peaking filter may result in large halos.

The control decreases the filter gain when the maximum defined filter is reached as a function of the difference between the target attenuation and the measured attenuation at maximum peaking frequency. A step wise decrease is in-built for less abrupt changes.

$$\text{filter\_gain} = \frac{\text{target\_attenuation}}{\text{measured\_attenuation}} \times \text{user\_defined\_filter\_gain}$$

However, steps are necessary to recover the filter gain when the video content changes and a lower than maximum frequency is selected. Similarly, a step wise increase is in-built for less abrupt changes.

It is also possible to increase the filter gain when the difference between the target attenuation and the measured attenuation is reduced due to changing video content. The criterion for increase is more stringent to prevent oscillation and in this case, the recommended filter gain must be equal to or higher than the current frequency.

The invention thus provides a novel and simple global automatic frequency selection apparatus such that optimal sharpness enhancement may be achieved.

Too low a peaking frequency renders a picture un-natural with strong halo effects while too high a peaking frequency does not improve the image sharpness but amplifies the high frequency noise. A halo effect on a sequence typically requires a higher peaking frequency. Insufficient sharpness on sequence typically requires a lower peaking frequency. It is possible to have excessive filter gain even though the maximum filter frequency is reached.

The effectiveness of global automatic frequency control is described below. A higher peaking frequency is typically selected for a video with sharper and high frequency edges. A lower peaking frequency is selected for a video with less sharp and low frequency edges. Filter gain can be decreased for optimal enhancement of details.

Figure 2:
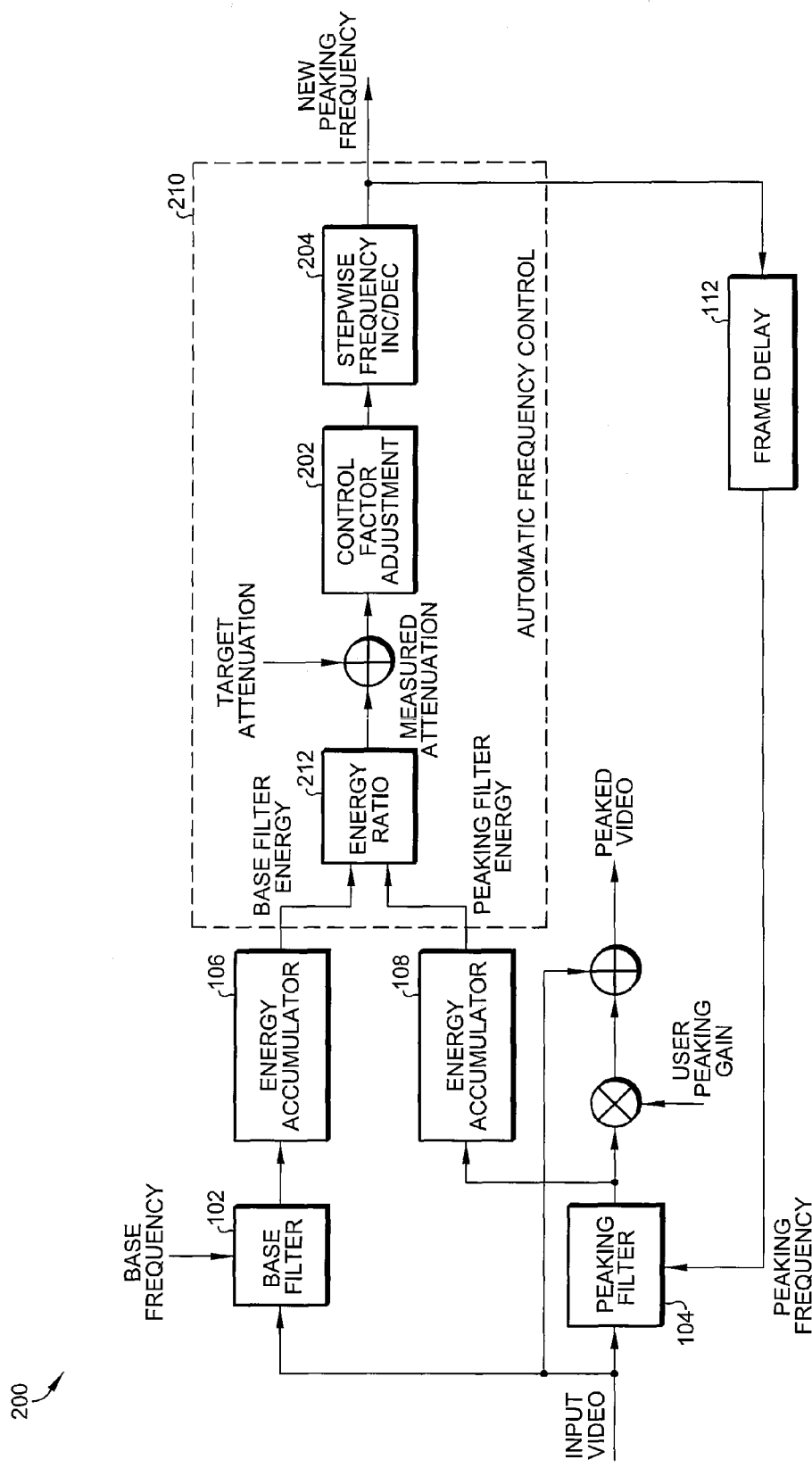
FIG. 2 is a functional block diagram for a global automatic frequency control circuit according to a second embodiment of the present invention without the peaking gain control function.

A second embodiment 200 of the invention is shown in FIG. 2. While all of the reference numerals and interconnections are the same, note that the automatic frequency control is different. The automatic frequency control has been assigned the reference number 210 to distinguish it from the previous automatic frequency control 110 shown in FIG. 1. In automatic frequency control block 210, the filter gain adjustment block 206, user peaking gain input, and new peaking gain output have all been removed. The user peaking gain is applied directly to the multiplier of the peaking circuitry as shown.

While only certain embodiments have been set forth, numerous other alternatives and modifications will be apparent from the above description to those skilled in the art. These and other alternatives are considered equivalents and within the spirit and scope of this disclosure and the appended claims.

What is claimed:

1. An automatic frequency selection circuit comprising:
a base filter for receiving a video input;
a peaking filter for receiving the video input and providing a peaked video output;
a first energy computation unit coupled to an output of the base filter;
a second energy computation unit coupled to an output of the peaking filter;
an automatic frequency control unit to compare relative measured energies of the first and second energy computation units and to output a temporarily stable selected frequency for a targeted attenuation; and
a frame delay feedback unit for receiving the temporarily stable selected frequency coupled to the peaking filter.

2. The automatic frequency selection circuit as in claim 1 wherein the base filter comprises a finite impulse response filter.

3. The automatic frequency selection circuit as in claim 1 wherein the peaking filter comprises a finite impulse response filter.

4. The automatic frequency selection circuit as in claim 1 wherein the first energy computation unit comprises a squaring circuit and an accumulator.

5. The automatic frequency selection circuit as in claim 1 wherein the second energy computation unit comprises a squaring circuit and an accumulator.

6. The automatic frequency selection circuit as in claim 1 wherein the automatic frequency control unit comprises:
an energy ratio block coupled to the first energy computation unit and to the second energy computation unit for providing a measured attenuation output;
a control factor adjustment block for receiving an error signal computed by subtracting a target attenuation from the measured attenuation output; and
a stepwise frequency increment/decrement unit coupled to the control factor adjustment block for providing the temporarily stable selected frequency.

7. The automatic frequency selection circuit as in claim 6 wherein the automatic frequency control unit further comprises a filter gain adjustment unit.

8. The automatic frequency selection circuit of claim 7 wherein the filter gain adjustment unit receives the target attenuation and a user peaking gain input.

9. The automatic frequency selection circuit of claim 7 wherein the filter gain adjustment unit provides a new peaking gain to a multiplier associated with the peaking filter.

10. The automatic frequency selection circuit as in claim 1 wherein the frame delay feedback unit provides a next-frame delay.

11. An automatic frequency selection method for a television, display set, video CD player, DVD player, DVD recorder, or set-top-box, the method comprising:
base filtering a video input;
peaking filtering the video input and providing a peaked video output at a peaked frequency;
computing a base filter energy;
computing a peak filter energy;
comparing the computed energies to output a temporarily stable selected frequency for adjusting the peak frequency; and
adjusting the gain of the peak filtering, such that the sharpness of the video output of the respective television, display set, video CD player, DVD player, DVD recorder, or set-top-box is enhanced with respect to the video input.

12. The automatic frequency selection method as in claim 11 wherein the base filtering is provided by a finite impulse response filter.

13. The automatic frequency selection method as in claim 11 wherein the peak filtering is provided by a finite impulse response filter.

14. The automatic frequency selection method as in claim 11 wherein the base filter energy is computed by a squaring circuit and an accumulator.

15. The automatic frequency selection method as in claim 11 wherein the peak filter energy is computed by a squaring circuit and an accumulator.

16. The automatic frequency selection method as in claim 11 wherein comparing the computed energies to output a temporarily stable selected frequency for adjusting the peak frequency comprises providing an energy ratio block for computing a ratio between the base filter energy and the peak filter energy.

17. The automatic frequency selection method of claim 11 wherein the adjusting comprises using a target attenuation and a user peaking gain input.

18. The automatic frequency selection method of claim 11 wherein the adjusting provides a new peaking gain to a multiplier associated with the peak filtering.

19. The automatic frequency selection method as in claim 11 further comprising delaying the temporarily stable selected frequency before adjusting the peak frequency.

20. An automatic frequency selection method practiced in a circuit comprising:
 providing a base filter for receiving a video input;
 providing a peaking filter for receiving the video input and providing a peaked video output;
 providing a first energy computation unit coupled to an output of the base filter;
 providing a second energy computation unit coupled to an output of the peaking filter;
 providing an automatic frequency control unit to compare relative measured energies of the first and second energy computation units and to output a temporarily stable selected frequency for a targeted attenuation; and
 providing a frame delay feedback unit for receiving the temporarily stable selected frequency coupled to the peaking filter.

* * * * *